United States Patent
Rao et al.

(10) Patent No.: US 12,455,875 B2
(45) Date of Patent: *Oct. 28, 2025

(54) DATA MANAGEMENT SYSTEM USING ATTRIBUTED DATA SLICES

(71) Applicant: Vail Systems, Inc., Deerfield, IL (US)

(72) Inventors: Srinivasa Rao, Deerfield, IL (US); Todd Whiteley, Deerfield, IL (US); Bopsi Chandramouli, Deerfield, IL (US); David Fruin, Deerfield, IL (US)

(73) Assignee: VAIL SYSTEMS, INC., Deerfield, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/792,141

(22) Filed: Aug. 1, 2024

(65) Prior Publication Data
US 2024/0394246 A1    Nov. 28, 2024

Related U.S. Application Data

(63) Continuation of application No. 17/317,412, filed on May 11, 2021, now Pat. No. 12,072,869.
(Continued)

(51) Int. Cl.
*G06F 16/23* (2019.01)
*G06F 16/13* (2019.01)
*G06F 16/245* (2019.01)

(52) U.S. Cl.
CPC .......... *G06F 16/2379* (2019.01); *G06F 16/13* (2019.01); *G06F 16/245* (2019.01)

(58) Field of Classification Search
CPC .......... G06F 16/10; G06F 16/13; G06F 16/14; G06F 16/148; G06F 16/245; G06F 16/2379
See application file for complete search history.

(56) References Cited

U.S. PATENT DOCUMENTS 5,966,704 A * 10/1999 Furegati ................ G06F 16/221
7,370,054 B1 * 5/2008 Martin ................ G06F 16/9014
707/999.1
(Continued)

FOREIGN PATENT DOCUMENTS

CA      2785398 A1 *  6/2011  ....... G06F 16/24532
WO      2014028871     2/2014
WO      2018133762     7/2018

OTHER PUBLICATIONS

Extended European Search Report issued in EP Application No. 21173536.0, dated Sep. 29, 2021.

*Primary Examiner* — James E Richardson
(74) *Attorney, Agent, or Firm* — ICE MILLER LLP; Safet Metjahic

(57) ABSTRACT

Methods and systems for data management include representing, organizing, and accessing very large data sets. Embodiments describe supporting data sets of various size based on attributed data slices (ADSs) to enable reduced memory requirements, query decomposition and parallel execution, and constant execution times for concurrent queries. The ADSs can include data buckets comprising items that are grouped by an attribute key. Attribute groups can be further sorted (e.g., in ascending order) based on the attribute key. According to some embodiments, the essential structure of an ADS provides additional functionality while preserving the behavior expected of an ADS through the use of an Extension Block containing attribute location data.

20 Claims, 9 Drawing Sheets

Related U.S. Application Data

(60) Provisional application No. 63/025,493, filed on May 15, 2020.

(56) References Cited

U.S. PATENT DOCUMENTS

| | | | |
|---|---|---|---|
| 8,397,028 B2* | 3/2013 | Spackman | G06F 16/1748 |
| | | | 707/753 |
| 2002/0194209 A1 | 12/2002 | Bolosky et al. | |
| 2003/0091338 A1* | 5/2003 | Snow | G11B 20/1217 |
| 2004/0015724 A1 | 1/2004 | Pham et al. | |
| 2004/0078383 A1* | 4/2004 | Mercer | G11B 27/34 |
| | | | 707/999.102 |
| 2008/0052261 A1* | 2/2008 | Valenci | G06F 16/10 |
| 2008/0104149 A1* | 5/2008 | Vishniac | G06F 16/22 |
| 2009/0259815 A1* | 10/2009 | Feiste | G06F 9/384 |
| | | | 711/E12.001 |
| 2011/0055178 A1 | 3/2011 | Mark | |
| 2013/0311426 A1* | 11/2013 | Erdogan | G06F 16/278 |
| | | | 707/610 |
| 2014/0139735 A1* | 5/2014 | Liu | H04N 7/0117 |
| | | | 348/441 |
| 2014/0143256 A1* | 5/2014 | Mooser | G06F 16/2228 |
| | | | 707/769 |
| 2019/0228028 A1* | 7/2019 | Guo | G06F 16/41 |
| 2021/0365413 A1* | 11/2021 | Shilane | G06F 18/22 |
| 2023/0114452 A1* | 4/2023 | Li | G06F 11/1453 |
| | | | 714/6.3 |

* cited by examiner

300

| File Offset (Bytes) | Data Description | Size (Bytes) |
|---|---|---|
| 0 | File size in bytes (say $F_s$) | 8 |
| 8 | Number of hash buckets in the ADS | 8 |
| 16 | Number of data items (N) | 8 |
| 24 | ADS Type (set to 0 for basic ADS) | 4 |
| | This space may be used when ADS Type > 0 (301) | |
| 1024 | Offset to 0$^{th}$ bucket (say $X_0$) | 8 |
| 1032 | Offset to 1$^{st}$ bucket ($X_1$) | 8 |
| .... | .... | .... |
| 1024 + 8(K-1) | Offset to the k$^{th}$ bucket ($X_k$) | 8 |
| .... | .... | .... |
| 1024 + 8(N-1) | Offset to the last bucket | 8 |
| Bucket 0 (at $X_0$) | Bucket 0 data. This includes some bucket metadata as well as the data serialized by all the items in the bucket. Assume that any arbitrary bucket K has a total data size of $S_k$ bytes. | |
| .... | .... | .... |
| Bucket K (at $X_k$) | Index of the bucket K (= K) used as a checksum | 8 |
| $X_k$ + 8 | Count of data objects in the bucket K (say $C_k$) | 8 |
| $X_k$ + 16 | Data for object 0 of bucket K | $S_{k0}$ |
| .... | .... | .... |
| $X_k + 16 + \sum_{i=0}^{j-1} S_{ki}$ | Data for object j of bucket K | $S_{kj}$ |
| .... | .... | .... |
| .... | .... | .... |
| Bucket N-1 ($X_{N-1}$) | Last bucket (N-1) data. This includes some bucket metadata as well as the data serialized by all the items in the bucket. | $S_{N-1}$ |

$F_s \rightarrow$

FIG. 4

| File Offset (Bytes) | Data Description | Size (Bytes) |
|---|---|---|
| 0 | File size in bytes (say $F_s$) | 8 |
| 8 | Number of data buckets in the ADS | 8 |
| 16 | Number of data items (N) | 8 |
| 24 | ADS Type (set to 1 for ADS1) | 4 |
| 28 | Offset to the ADS1 Extension Block (say $Y_1$) | 8 |
| Extension Block 401 (used when ADS type > 1) | | |

| File Offset (Bytes) | Data Description | Size (Bytes) |
|---|---|---|
| Y1 | Offset to $0^{th}$ bucket lookup data (say $Z_0$) | 8 |
| Y1 + 8 | Offset to $1^{st}$ bucket lookup data ($Z_1$) | 8 |
| .... | .... | .... |
| Y1 + 8(K-1) | Offset to the $k^{th}$ bucket lookup data ($Z_k$) | 8 |
| .... | .... | .... |
| Y1 + 8(N-1) | Offset to the last bucket lookup data | 8 |
| Bucket 0 lookup data ($Z_0$) | Bucket 0 lookup data. Assume that any arbitrary bucket K has a total data size of $S_k$ bytes | |
| .... | .... | .... |
| Bucket K lookup data ($Z_k$) | Number of distinct attributes in the bucket | 4 |
| $Z_k + 4$ | Data for Attribute 0 | $D_0$ |
| .... | .... | .... |
| $Z_k + 4 + \sum_{i=0}^{J-1} D_i$ | Data for Attribute J | $D_k$ |
| .... | .... | .... |
| .... | .... | .... |
| Bucket N-1 lookup data ($Z_{N-1}$) | Last bucket (N-1) lookup data. | $D_{N-1}$ |

FIG. 6

DATA MANAGEMENT SYSTEM USING ATTRIBUTED DATA SLICES

CROSS-REFERENCE TO RELATED APPLICATION

This is a Continuation of U.S. application Ser. No. 17/317,412, filed May 11, 2021, and claims priority to and the benefit of provisional U.S. Patent Application No. 63/025,493, titled "Data Management System Using Attributed Data Slices," filed May 15, 2020, which is hereby incorporated herein by reference in its entirety.

FIELD OF THE DISCLOSURE

The present disclosure relates to a method, a system and a computer program for representing, organizing and accessing very large data sets.

BACKGROUND OF THE DISCLOSURE

Recent advances in computing power and data storage have resulted in increased usage of big data and machine learning-based analytics. Big data management has become front and center for many enterprises. However, existing data management solutions have significant shortcomings. This disclosure provides a novel solution that addresses those shortcomings, and others.

SUMMARY OF THE DISCLOSURE

The disclosure provides a novel data management solution for representing, organizing, and accessing very large data sets. The solution is capable of supporting data sets of any size with very low memory requirements, query decomposition and parallel execution, and near constant execution times for concurrent queries. The solution includes a novel, low-memory, highly performant, massively scalable data management system and method based on attributed data slices (ADSs).

Efficient, low-memory, high performance, massively scalable data management systems and methods are provided based on attributed data slices. Systems and methods separate the data organization from the data details within an ADS. The essential structure of the ADS are represented and can include data buckets comprising items that are grouped by an attribute key. Attribute groups can be further sorted (e.g., in ascending order) based on the attribute key. According to some embodiments, the essential structure of an ADS provides additional functionality while preserving the behavior expected of an ADS through the use of an Extension Block containing attribute location data. In some embodiments, each data access operation can be accompanied by a data access context (DAC) allowing fine grained control on how each data query can be optimized based on the specified DAC. According to some embodiments, a system and method is provided to group multiple data slices into larger logical aggregate structure by stacking the data slices.

In some embodiments, an ADS can be divided into smaller data slices, each having the same essential structure of an ADS. Additionally, each slice can be partitioned for processing along the direction of a hash bucket array. Data slices can be aggregated and collapsed into an atomic data slice, to enable recursive data consolidations to be performed. In some embodiments, data queries can be decomposed into many subqueries, and executed in parallel over smaller data ranges. Data queries and data access can be parallelized to any desired degree limited only by the processor cores or CPU resources. Extensions can be made to the data slices without disturbing the generality of the data management system. According to some embodiments, systems and methods are provided by which only the query execution is facilitated by the ADS, the query logic is supplied by the application, and the physical data details are encapsulated within the data types.

In some embodiments, methods are provided for managing data based on attributed data slices, including representing, organizing, or accessing data sets. For example, according to some embodiments, operations can include identifying a collection of data items in memory; and building an attributed data slice comprising the collection of data items, where the attributed data slice comprises three distinct sections. In some embodiments, each sections can include a header block containing metadata for the attributed data slice, including at least one of a geometry of the attributed data slice and type of the attributed data slice. In some embodiments, each section can include an offsets table containing a file offset to a data bucket in the attributed data slice. Each section can additionally include a data block containing all data buckets for the attributed data slice in a strict order, where each data bucket starts at a location indicated for it in the offsets table. In some embodiments, each section can include an extension block arranged to support additional bucket level lookup data. The extension block can be arranged to facilitate location of data in a data bucket in the attributed data slice without any scanning. The extension block can be located at an offset indicated in a header block. Additionally, operations can include stacking the attributed data slice atop of another attributed data slice to build an attributed data slice group, building the other attributed data slice from another collection of data items, where the collection of data items and the other collection of data items can be related (e.g., as a function of time).

According to some embodiments, operations can include receiving data access context containing filtering criteria from an application and executing a query by finding data items in the attributed data slice and applying the filter criteria to the data items. The applying the filter criteria to the data items can include verifying each data item against the filter criteria; and either including or excluding each data item from a result set, further including: receiving a query involving multiple attributes; decomposing the query into a plurality of subqueries; and executing the plurality of subqueries in parallel. Each of the plurality of subqueries can relate to a logical data partition in the attributed data slice group. The query can involve multiple data ranges or time ranges.

In a non-limiting embodiment, a non-transitory computer readable storage medium is provided that contains data management program instructions for managing data based on attributed data slices, including representing, organizing, or accessing data sets, the program instructions. When executed by a processor, the program instruction cause the processor to perform operations. The operations can include identifying a collection of data items in memory and building an attributed data slice including the collection of data items, wherein the attributed data slice includes three distinct sections. Each section can include: a header block containing metadata for the attributed data slice, including at least one of a geometry of the attributed data slice and type of the attributed data slice.

According to some embodiments, sections include: an offsets table containing a file offset to a data bucket in the attributed data slice. sections further include a data block containing all data buckets for the attributed data slice in a strict order, wherein each data bucket starts at a location indicated for it in the offsets table. sections include an extension block arranged to support additional bucket level lookup data. extension block can be arranged to facilitate location of data in a data bucket in the attributed data slice without any scanning. extension block can be located at an offset indicated in a header block. According to some embodiments, operations can include stacking the attributed data slice atop of another attributed data slice to build an attributed data slice group. According to additional embodiments, operations can include building said another attributed data slice from another collection of data items, wherein said collection of data items and said another collection of data items can related as a function of time.

Operations can also include receiving data access context containing filtering criteria from an application; and executing a query by finding data items in the attributed data slice and applying the filter criteria to the data items. Applying the filter criteria to the data items can include verifying each data item against the filter criteria; and either including or excluding each data item from a result set. According to some embodiments, operations can include receiving a query involving multiple attributes, decomposing the query into a plurality of subqueries, and executing the plurality of subqueries in parallel. Each of the plurality of subqueries can involve a logical data partition in the attributed data slice group. query involves multiple data ranges or time ranges.

According to some embodiments, systems for managing data based on attributed data slices can perform operations including representing, organizing, or accessing data sets. A system can include a receiver arranged to receive data items, a memory arranged to store the data items, and a attributed data slice build unit arranged to collect or organize the data items in the memory and build an attributed data slice in the memory.

The attributed data slice can include a header section and a data section. The header section can include a header block containing metadata for the attributed data slice, including at least one of a geometry of the attributed data slice and type of the attributed data slice. The header section can include an offsets table containing a file offset to a data bucket in the attributed data slice. The data section includes a data block containing all data buckets for the attributed data slice, for example, in a strict order. Each data bucket starts at a location indicated for it in the offsets table.

The header section can include an extension block arranged to support additional bucket level lookup data. The extension block can be arranged to facilitate location of data in a data bucket in the attributed data slice without any scanning. The extension block can be located at an offset indicated in the header section. An attribute data slice grouping unit can be arranged to stack the attributed data slice atop of another attributed data slice to build an attributed data slice group. The attribute data slice grouping unit can be arranged to build said another attributed data slice from another collection of data items. The collection of data items and the other collection of data items can be related as a function of time.

According to some embodiments, systems can include a data access context unit can configured to receive data access context containing filtering criteria from an application. A query executor can be arranged to execute a query by finding data items in the attributed data slice and applying the filter criteria to the data items. The query executor can be configured to verify each data item against the filter criteria and either include or exclude each data item from a result set. The query executor can be configured to receive a query involving multiple attributes. A query decomposer can be configured to divide the query into a plurality of subqueries, wherein the query executor can be configured to execute the plurality of subqueries in parallel on the attributed data slice group. Each of the plurality of subqueries can involve a logical data partition in the attributed data slice group. The query can be performed to involve multiple data ranges or time ranges.

Embodiments disclosed herein can separate data organization from the data details within an ADS. The solution can represent the essential structure of an ADS. Embodiments can include grouping data buckets containing items by an attribute key and sorting attribute groups in ascending (or descending) order of the attribute key. The solution can extend the essential structure of an ADS to provide additional functionality while preserving the behavior expected of an ADS through the use of an Extension Block containing attribute location data.

Each data access operation can be performed accompanied by a DAC, allowing fine grained control on how each data query can be optimized based on the specified DAC. Multiple data slices can be grouped into a larger logical aggregate structure by stacking many data slices. A data slice can be divided into smaller data slices, each having the same essential structure of an ADS. Data slices can also be partitioned for processing along the direction of a hash bucket array. Data slices can be aggregated and collapsed into an atomic data slice, permitting recursive data consolidations. According to some embodiments, data queries can be decomposed into many subqueries executed in parallel over smaller data ranges. Data queries and data access can be performed in parallel to any degree. According to some embodiments, extensions to the data slices cam be created and processed without disturbing the generality of the data management system. Embodiments described herein can facilitate query execution by the ADS and enable the application to supply a query logic. The physical data details can be included within the data types.

Additional features, advantages, and embodiments of the disclosure may be set forth or apparent from consideration of the detailed description and drawings. Moreover, it is to be understood that the foregoing summary of the disclosure and the following detailed description and drawings provide non-limiting examples that are intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and the various ways in which it may be practiced.

FIG. 4 illustrates an arrangement an embodiment of a physical storage format (PSF) of the attributed data slice in parametric format, according to some embodiments.

FIG. 5 illustrates an arrangement of a header section in the attributed data slice, including a header portion and a metadata portion, according to some embodiments.

FIG. 6 illustrates an embodiment of a format for an attributed data slice extension block.

Figure 1:
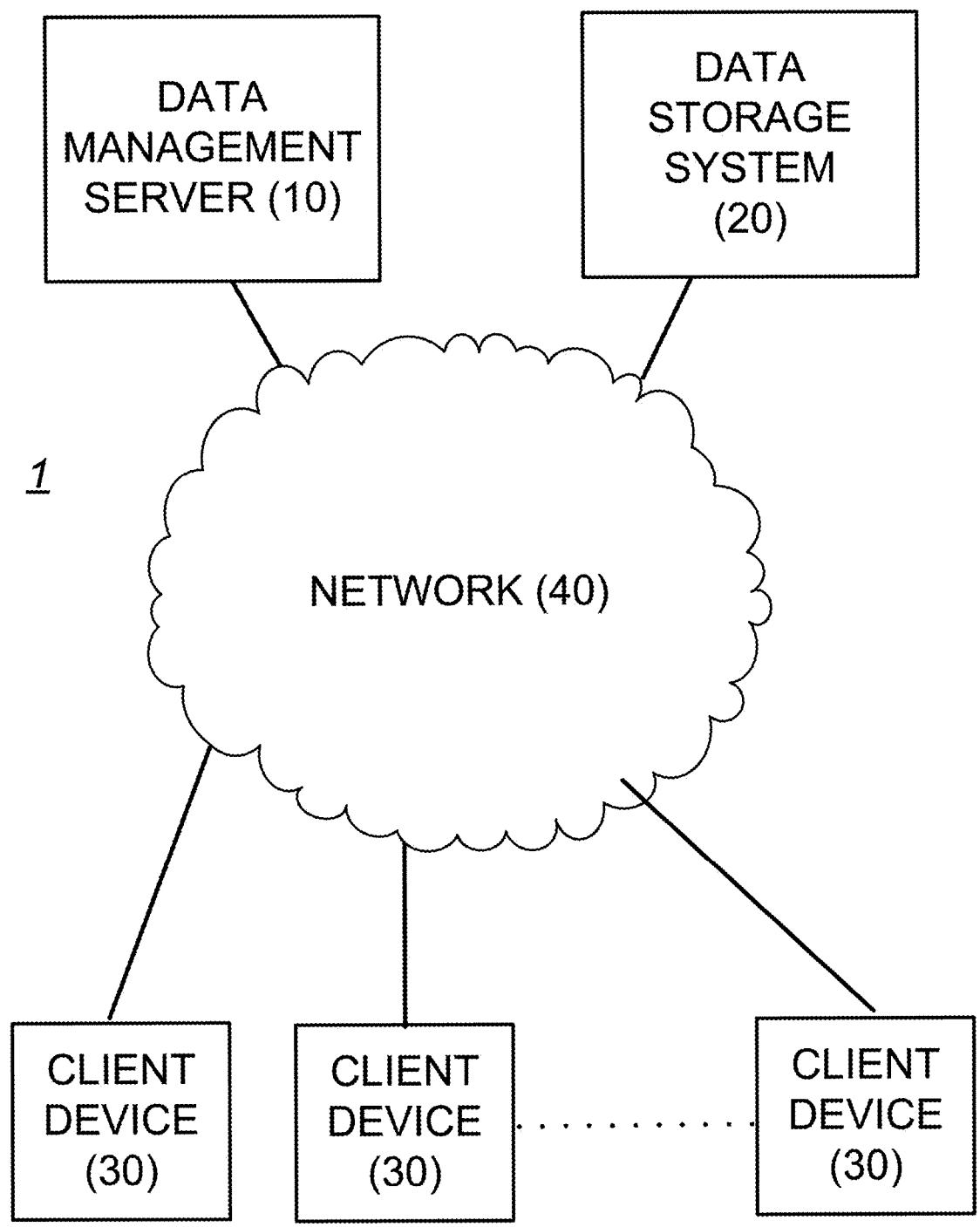
FIG. 1 illustrates an example of a user environment, according to some of the data management solution.

The present disclosure is further described in the detailed description that follows.

DETAILED DESCRIPTION OF THE DISCLOSURE

The disclosure and its various features and advantageous details are explained more fully with reference to the non-limiting embodiments and examples that are described or illustrated in the accompanying drawings and detailed in the following description. It should be noted that features illustrated in the drawings are not necessarily drawn to scale, and features of one embodiment can be employed with other embodiments as those skilled in the art would recognize, even if not explicitly stated. Descriptions of well-known components and processing techniques may be omitted so as to not unnecessarily obscure the embodiments of the disclosure. The examples are intended merely to facilitate an understanding of ways in which the disclosure can be practiced and to further enable those skilled in the art to practice the embodiments of the disclosure. Accordingly, the examples and embodiments should not be construed as limiting the scope of the disclosure. Moreover, it is noted that like reference numerals represent similar parts throughout the several views of the drawings.

Currently, data is collected from a variety of sources, including government agencies, scientific or research institutions, business organizations, industry, educational institutions, Internet-of-Things (IoT) devices, or social media, among others, and stored in big data storage platforms, such as, for example, in-memory databases, data lakes or Hadoop clusters. With the growth of technologies such as IoT and the expansion of high speed communication networks such as 5G, there exists an urgent and unprecedented need for a data management solution that can effectively and efficiently represent, organize or access very large data sets. The instant disclosure provides a data management solution that meets this need and others, as made evident by the following description.

The disclosure provides a data management solution that can effectively and efficiently represent, organize and access very large data sets, including, for example, "big data" data sets. The data management solution is capable of supporting data sets of any size with very low memory requirements, query decomposition and parallel execution, and near constant execution times for concurrent queries. The solution can provide performance that is many orders of magnitude better and faster than, for example, standard SQL (Structured Query Language) or NoSQL (Not only SQL) databases for the same application requirements. The solution includes a data management (DM) system that is low-memory, highly performant, massively scalable and can effectively and efficiently represent, organize and access very large data sets.

FIG. 1 shows an example of a data management environment 1 that includes an embodiment of the solution. The environment 1 includes a data management (DM) server 10 and a data storage system 20. The DM server 10 can include a non-limiting embodiment of a data management (DM) system 100 (shown in FIG. 2). The storage system 20 can include a big data storage platform, such as, for example, an in-memory database or Hadoop cluster. The storage system 20 can include a parallel file system. The storage system 20 can be centralized or distributed, such as, for example, in a cloud network. The storage system 20 can be integrated or collocated with the DM server 10.

The environment 1 can include one or more client devices 30, any of which can be arranged to communicate over a communication link with the data manager server 10. Each client device 30 can include a computer resource asset, such as, for example, a computing device or a communicating device. Each client device 30 can be arranged to transmit a query to the DM server 10 and receive results data from the DM server 10 in response to the query.

The environment 1 can include a network 40. The network 40 can connect over one or more communication links to the DM server 10, storage system 20 or client devices 30. The DM server 10 can be arranged to communicate with the storage system 20 over the network 40, or directly via a communication link. The DM server 10 can interact with the storage system 20 and represent, organize or access very large data sets in the storage system 20.

The DM server 10 can process data items in the storage system 20 and create a collection of data items as an ADS, wherein each data item in the ADS has at least three properties, including: (1) the data item has at least one attribute by which it can be looked up in a collection; (2) the data item knows how to write itself to disk (serialization); and (3) the data item knows how to construct itself from a location indicated to it within an ADS file. The DM server 10 can include an Attributed Data Entity (ADE) data type to support the ADS, including the properties (1) to (3) of the data items included in the ADS. The ADS can exist in memory in any manner that is appropriate, such as, for example, in the DM server 10 or data storage system 20.

The DM server 10 can organize the data items into data buckets with each data bucket comprising an array of data items. The DM server 10 can organize the data buckets into an array of data buckets to organize the entire data within the ADS—for example, the array of data buckets can contain all the data of the ADS. The DM server 10 can separate data organization from the data details within each ADS and represent the essential structure of the ADS.

The DM server 10 can group data buckets containing data items into attribute groups by an attribute key and sort each of the attribute groups in ascending (or descending) order of the attribute key. The DM server 10 can extend the essential structure of an ADS to provide additional functionality while preserving the behavior expected of an ADS through the use of an Extension Block containing attribute location data.

The DM server 10 can accompany every data access operation by a data access DAC and allow fine grained control on how each data query can be optimized based on the specified DAC.

As a non-limiting example of how the DAC can work, consider a simple example involving ADS slices containing Call Detail Records (CDRs). A CDR contains call leg objects, and cdr-auxiliary-records (or app-nav) objects. In one non-limiting example, a CDR may contain two or more call legs and several dozen cdr-auxiliary-records (or app-navs). A query of CDR data for a given caller needs to retrieve all the CDRs for a given calling phone number (ANI)—subject to other criteria that depend on the data inside the call legs and/or the cdr-auxiliary-records (or app-navs).

A caller history query can contain a time period of interest. So, all CDRs satisfying the query within that time period need to be included in the result set.

Optionally, a maximum number of CDRs to retrieve may be specified. This can be similar to a LIMIT clause in an SQL query.

An optional sorting of the results may be specified—so that the oldest or the newest CDRs within the specified time period are returned first. This can be similar to an ORDER BY clause in an SQL query.

The CDR data type can include information about the structure of the CDRs. For example, the CDR data type can include information about the fields in the call legs, fields in the app-navs, etc.

An ADS slice group can include information about ADS slices and the corresponding time range of each slice. An ADS can include information about where the CDR items are in the slice—but does not know what is inside each item. As described below, the DAC enables optimization of processes by managing structure with respect to at least the application, the ADS slice group, the ADS slices, and the data types.

In some embodiments, the application can determine various information about a CDR query such as, for example, the time range of the query, the maximum number of CDRs needed from the query, whether or not the query touches the call leg data, app-nav data, etc. It further knows about the clauses within the query (e.g., a clause including variables, variable values, and the condition that must be satisfied by the variables and values).

The DAC can organize (e.g., combine) all of the above information into one logical entity. The DAC logical entity can include, for example, the time range information which will be processed by the ADS slice group to pick the slices relevant to the query. In some embodiments, a sorting requirement can be specified in the DAC. For example, if a sorting requirement exists, that too can be specified in the DAC for the ADS slice group to know how to order the relevant slices when it is time to process the slices. This is one way a DAC can enable a slice group to process only some slices and not others—improving efficiency of the DAC and reducing or eliminating unnecessary operations.

In some embodiments, if the application determines that the current query is a critical query needing extreme performance, the application can provide thread data, within the DAC information, such as information about how many threads are provisioned for the query. The thread contexts can be included in the DAC, so that the ADS slice group can utilize the provided threads to schedule the processing of the individual slices in the provided thread wrappers. Thus, query decomposition and parallelization can be achieved.

The DAC can contain the maximum number of CDRs desired from the query. As each slice is taken up by the ADS slice group, the DAC can be passed down to the slice. The DAC can contain the primary attribute of the ADS slice (in this example, it is the ANI). The slice can first hash the ANI to find the data bucket where the caller data would be found, and start to scan the items in the bucket (this scenario corresponds to the use case when we are not using Extension Blocks). The number of items that are already selected (not filtered) by the query can be maintained in the DAC. This number can be constantly checked by the slice as it scans and selects the caller CDRs to be included in the result set (also maintained in the DAC). As and when the number of selected CDRs exceeds the LIMIT specified in the DAC, the slice can break off the scan, and return control to the ADS slice group that invoked it. The ADS slice group can check the return code from the slice and decide that it no longer needs to process the remaining slices, and return control back to the application. This is another example of how the DAC can help optimize the query, the exact amount of work, and nothing beyond that is performed by using the DAC.

The DAC can contain hints (bit flags) that indicate to the CDR data type that its query clauses only touch the data within the call legs and does not touch any data within the app-navs. When an ADS slice starts to scan a data bucket for CDRs, it can hand off the responsibility of reading the CDR from the slice to the factory methods within the CDR data type. That factory method can look at the DAC and know that, since the query does not touch any data within the app-navs, it does not need to construct (deserialize) the app-nav objects when it goes about building the CDR object from the data blob indicated to it by the ADS slice. This is an example of how the DAC can allow partial construction of data items—to the exact extent needed by the clauses in query, to be performed. Object construction is always an expensive process and avoiding constructing needless parts of an object over a collection of objects provides considerable performance optimizations.

A DAC can always contain the primary attribute of an ADS. This is how slices can know which data bucket to start looking for data. When a slice hands off the reading of a CDR item to the factory methods in the CDR data type, the factory method knows that the data blob at the position indicated to it by the slice contains the size of the item followed by the ANI. The factory method first only reads these two values. If the ANI does not match the query, it can silently skip to the next item without deserializing the blob further. In most cases, the DAC can allow rapid hops across the data items. When Extension blocks are used, such scans are not needed—but in this example, we are considering a situation where Extension blocks are not being used.

For complex queries, the application can include chunks of code or function callbacks within the DAC. In such cases, the factory method can invoke these lambdas or function callbacks at different stages of deserialization for the application's filtering logic to indicate if the item continues to be of interest or not. Depending on the intent expressed by the filtering logic (for example, return values from the lambdas or the callbacks), the factory methods can continue with the deserialization of the CDR or return the control back to the slice so that it can skip ahead to the next item in the data bucket.

The above are just some examples of the optimizations that are made possible by the DAC and division of responsibilities between the application, the ADS slice group, the ADS slices, and the data types.

The DM server 10 can group multiple data slices into a larger logical aggregate structure by stacking many data slices.

The DM server 10 can break a data slice into smaller data slices, all of them having the same essential structure of the ADS. The DM server 10 can partition the data slices along the direction of a hash bucket array.

The DM server 10 can collapse an aggregation of data slices into an atomic data slice, thereby allowing recursive data consolidations.

The DM server 10 can decompose a data query, such as, for example, from an application (or computer resource) running on the client device 30 or the DM server 10, into many subqueries and execute the subqueries in parallel over smaller data ranges. The DM server 10 can parallelize data queries and data access to any degree, limited only by the performance capacity of the processor, such as, for example, a processor 110 (shown in FIG. 2).

The DM server 10 can make or add extensions to the data slices without disturbing the generality of the data management solution.

The DM server 10 can be arranged such that only the query execution is facilitated by the ADS. The query logic can be supplied by the application, and the physical data details can be encapsulated within the data types.

Figure 2:
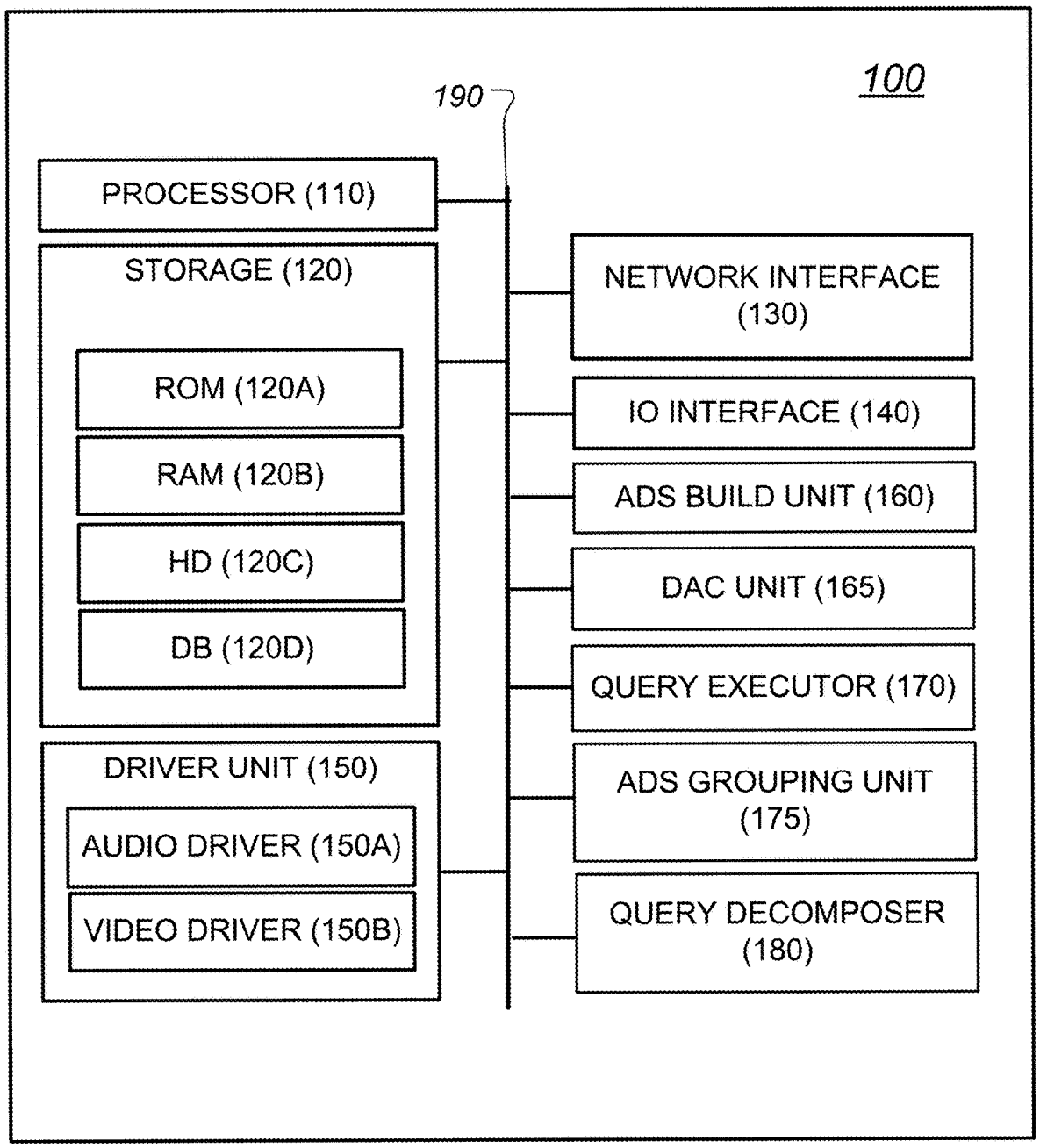
FIG. 2 illustrates a data management system included in the data management solution, according to some embodiments.

FIG. 2 shows a non-limiting embodiment of the DM system 100, constructed according to the principles of the disclosure. The DM system 100 includes the processor 110, a storage 120, a network interface 130, an input-output (IO) interface 140, a driver unit 150, an attribute data slice build unit 160, a DAC unit 165, a query executor 170, an attribute data slice grouping unit 175, a query decomposer 180 and a bus 190. The computer resource assets 150 to 180 can be provided as separate computing devices or can be integrated into one or more computing devices. The computer resource assets 150 to 180 can be provided as separate computer resources that are executable on the processor 110 as one or more computing resource processes. Any or all of the computer resource assets 110 to 180 can be connected to the bus 190 and exchange data or instructions over the bus 190 and/or one or more communication links.

The storage 120 can include a read-only-memory (ROM) 120A, a random-access-memory (RAM) 120, a hard drive (HD) 120C, and/or or a database (DB) 120D. The storage 120 can include a non-transitory computer-readable storage medium that can hold executable or interpretable computer program code or instructions that, when executed on the processor 110, cause the steps, processes or methods in the DM system 100 to be carried out. The computer-readable storage medium can be included in, for example the HD 120C.

A basic input-output system (BIOS) can be stored in a non-volatile memory in the storage 120, such as, for example, the ROM 120A, which can include, for example, an erasable programmable read-only memory (EPROM), an electrically erasable programmable read-only memory (EEPROM), or a flash memory. The BIOS can contain the basic routines that help to transfer information between computer resource assets in the DM system 100, such as during start-up.

The RAM 120B can include, for example, a static random access memory (SRAM), a non-volatile random-access memory (NVRAM), or any random access memory device suitable for caching data.

The HD 120C can include, for example, a solid-state drive (SSD), a hard disk drive (HDD), an optical disk drive (ODD), an enhanced integrated drive electronics (EIDE) drive or a serial advanced technology attachments (SATA) drive. The HD 120C can be arranged for external use in a suitable chassis (not shown). The HD 120C can be arranged to connect to the bus 190 via a hard disk drive interface (not shown) or an optical drive interface (not shown). The hard disk drive interface (not shown) can include a Universal Serial Bus (USB) (not shown) or an IEEE 1394 interface (not shown) for external applications.

The DB 120D can be arranged to store historical data, including queries. The DB 120D can be arranged to be accessed by any one or more of the computer resource assets in the DM system 100, including the processor 110. The DB 120D can be arranged to receive a query and, in response, retrieve specific records or portions of records based on the query. A record can include, for example, a file or a log.

The storage 120, including computer-readable media, can be arranged to provide nonvolatile storage of data, data structures, and computer-executable instructions. The storage 120 can accommodate the storage of any data in a suitable digital format. The storage 120 can include computing resources that can be used to execute aspects of the architecture included in the DM system 100, including, for example, a program module, an application program, an application program interface (API), or program data. In the non-limiting embodiment of the DM system 100 wherein the computer resource assets 150 to 180 are computer resources that are executable on the processor 110, the computer resources 150 to 180 can be stored in the storage 120. One or more of the computing resources can be cached in the RAM 120B as executable sections of computer program code or retrievable data.

The computing resources can include an API such as, for example, a web API, a simple object access protocol (SOAP) API, a remote procedure call (RPC) API, a representation state transfer (REST) API, or any other utility or service API.

The network interface 130 can be arranged to connect to the data storage system 20, the client devices 30, or the network 40 (shown in FIG. 1). The network interface 130 can be arranged to connect to the Internet or an external network. The network interface 130 can include a modem, transmitter, receiver or transceiver. The network interface 130 can include a wired or a wireless communication network interface. When used in a local area network (LAN), the network interface 130 can be arranged to include a wired or wireless communication network interface that can connect to the LAN; and, when used in a wide area network (WAN), the network interface 130 can be arranged to include a modem to connect to the WAN network. The modem can be internal or external and wired or wireless. The modem can be connected to the bus 190 via, for example, a serial port interface.

The IO interface 140 can be arranged to receive commands or data from an operator. The IO interface 140 can be arranged to connect to or communicate with one or more input-output devices, including, for example, a keyboard, a mouse, a pointer, a stylus, a microphone, a speaker, an interactive voice response (IVR) unit, a graphic user interface (GUI), or a display device. The IO interface 140 can include a transmitter, a receiver or a transceiver. The received commands or data can be forwarded from the IO interface 140 as instruction or data signals via the bus 190 to any computer resource asset in the DM system 100.

The driver unit 140 can include an audio driver 140A and a video driver 140B. The audio driver 140A can include, for example, a sound card, an interactive voice response (IVR) unit, a speaker or any other hardware device necessary to render a sound. The video driver 140B can include, for example, a video card, a video adaptor, a display device or any other device necessary to render an image signal.

The ADS build unit 160 can be arranged to collect or organize data items, for example, in the DM server 10 or storage system 20 (shown in FIG. 1) into an ADS. The ADS build unit 160 can collect or organize the data items into attribute groups based on one or more attribute keys. In collecting or organizing the data items, the ADS build unit 160 can organize an array of data items into a data bucket, and, subsequently, organize an array of data buckets into an ADS structure, such as, for example, ADS 300 depicted in FIG. 3. The entire data within the ADS can be organized into an array of data buckets. Each data item in the ADS has at least one attribute by which it can be looked up in the collection, knows how to write itself to disk (serialization), and knows how to construct itself from a location indicated to it within an ADS file. The attribute data slicer 160 can include a data type that supports these properties is an Attributed Data Entity (ADE).

The ADS can exist in memory during its construction in any manner that is appropriate. But when persisted to a file system, on a hard disk, a random-access-memory (RAM) disk, or any other storage system that supports random access, the ADS assumes a storage format shown in FIG. 3.

Figure 3:
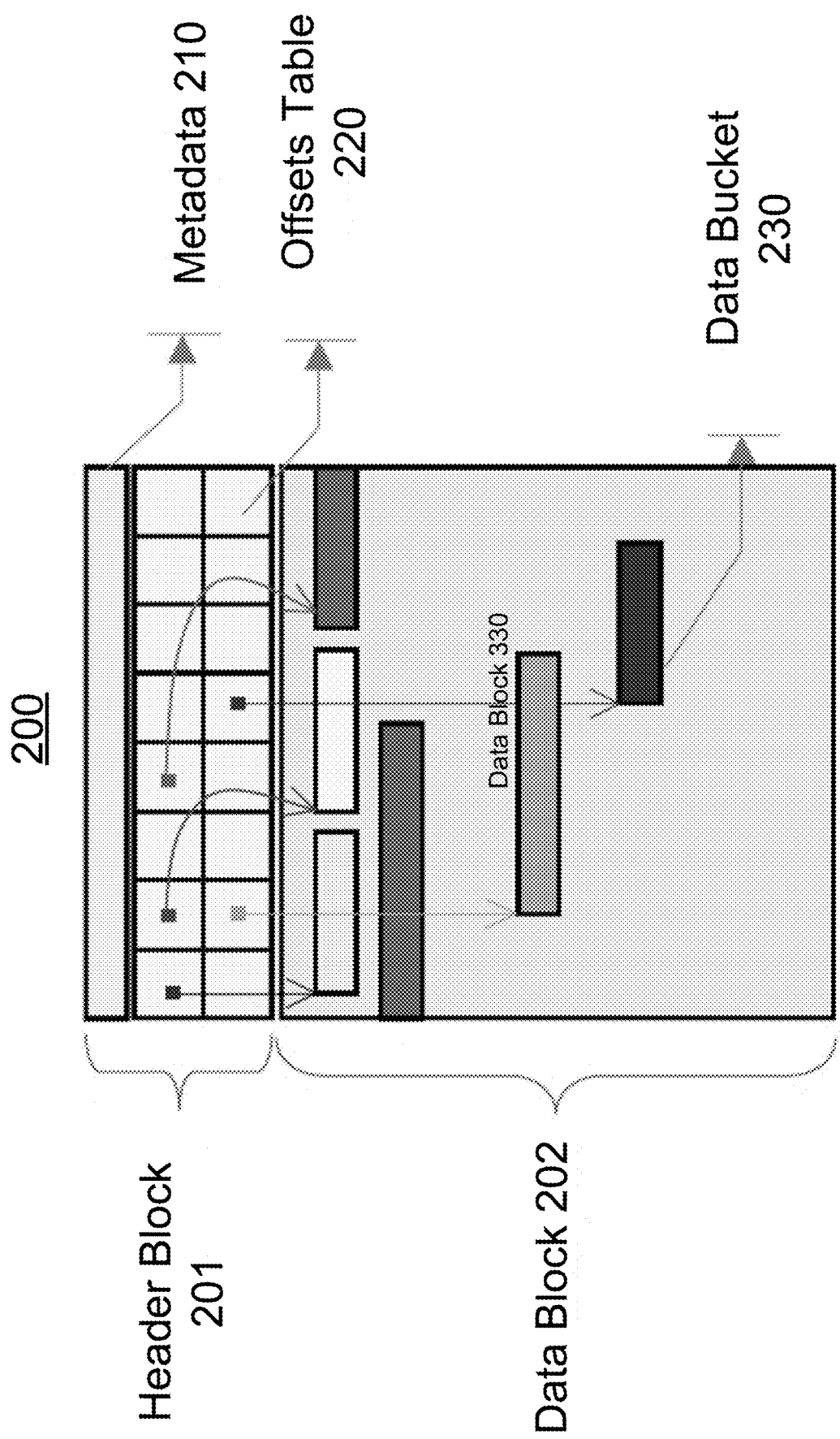
FIG. 3 depicts an embodiment of an attributed data slice structure, according to some embodiments.

Referring to FIG. 3, the ADS build unit 160 can be arranged to collect or organize data items and build the ADS 200, including three main distinct sections, including (i) a header 201 containing the metadata 210 for the ADS, (ii) an offset table 220 containing file offsets to the data buckets, and (iii) a data block 302 including all the data buckets 330 in strict order. As shown, the header 201 can include the metadata 210 and offset table 220.

The metadata 210 in the header section 301 can include the geometry of the ADS 200, the ADS type, or any other information that might be useful for the first section. This metadata 210 portion of the header 201 can be, for example, 1024 bytes in size, of which only the first 36 or 28 bytes might be used, depending on whether an Extension Block is being used or not.

ADS build unit 160 can create or organize the ADS 200 into at least three sections. However, in each embodiment, ADS 200 contains at least metadata 210, offset table 220, and data buckets 230. A non-limiting example of one such variation is described below, which demonstrates an example of the flexibility and extensibility of the ADS architecture in a manner that preserves backward compatibility with that of a basic ADS.

The ADS does not need to know anything about the physical storage format of the serialized data items. That aspect can be known to the data types. This can allow the ADS to separate itself from the physical representation of the data contained in it. The ADS can provide the organizational structure for the contained data, and know where items are located, but does not need to know anything further about the data items. As far as the ADS is concerned, each data item can be simply a data blob of unknown size. When the ADS needs to read a data item at a specific location, it can call upon the data item's factory methods to construct the data item. The factory method can be passed the location (for example, the file offset) of the data item, and it can be the data item's action of reading at the location that moves the file location forward to the next item.

The need to access data in the ADS 200 can be driven by some application concern or need, such as, for example, from an application running on the DM server 10 or client device 30 (shown in FIG. 1). An application can supply DAC data with every data access operation. As such, every action of reading data from the ADS can be accompanied by a representation of the application needs. The DAC can be used for fine-grained control on how each data query can be optimized based on the specified DAC.

The DAC unit 165 (shown in FIG. 2) can be arranged to parse DAC data from a data access operation and interact with the ADS build unit 160 when building or reading from the ADS. In this regard, the DAC unit 165 can be arranged to receive the DAC from an application related to a received query (for example, a query executed by the query executor 170, shown in FIG. 2). Therefore, every time a data item needs to be read from the ADS, the data item's factory methods can be given the location of the data item and a DAC. The data item factory can choose to use the information in the DAC to optimize the read operations. For example, information in the DAC can indicate that a particular data item is of no interest to the current data access context, or that only a specific part of the data item is of interest to the read operation. Based on this information, the data item factory method can do the minimal amount of work needed to satisfy the application need as expressed in the DAC. The data item factory can be responsible for moving the file location to the end of the item's data every time it might be invoked with a specific file location.

FIG. 4 depicts an example of a physical storage format (PSF) 300 of an embodiment of an ADS (e.g., ADS 200) in parametric format. The location of data with a given attribute can be determined by first applying a hash function to the attribute value. Since multiple attributes can be present in the same data bucket, a way to locate a specific attribute's data can be to start reading from the start of its data bucket until data is found for the attribute. If there are multiple data items having the same attribute (or hash key), then, once the data is encountered for that attribute, data items can continue to be read until an item with a different attribute value is reached. This works because it is the property of the ADS that all data items with the same attribute are always grouped together within a data bucket. The groups can be further sorted in ascending (or descending) order of their attribute string. The scan for a given attribute can end as soon as the scan encounters an item with a greater attribute value.

The above ADS embodiment can be sufficient for most data management applications. But, in situations where additional performance is required, the ADS can provide a mechanism by which additional lookup data can be used for each of the buckets within the ADS.

In another non-limiting embodiment, an extension of the basic ADS embodiment (e.g., ADS 200) format can be included by the DM system 100 to support additional bucket level lookup data. For these additional bucket level lookup data to be present, the ADS Type at offset 24 can be set to 1, indicating an extended ADS, instead of 0—which indicates a basic ADS. When the ADS Type is set to 1, the ADS 200 can expect to find an offset to an Extension Block 301 containing the bucket level lookup data for all the buckets in the ADS—following the ADS Type value in the header block.

FIG. 5 depicts an example of a header and metadata portion of an ADS 400 (which can be an embodiment of ADS 200) that can be built by the ADS build unit 160 when the ADS Type is set to 1 (e.g., an extended ADS). The Type 1 ADS Extension Block allows for location of the attribute data being searched for within the attribute's target data bucket without any scanning. The Extension Block 401 is located at the offset indicated in the header block, and is located at the end of the basic ADS data. So, a Type 1 ADS can work just like a regular ADS if chosen for use in that way. A determination can be made whether it is a Type 1 ADS, and if so, the additional data provided by the Extension Block 401 can be used, improving operation performance.

FIG. 6 depicts a non-limiting example of a PSF 500 for the Type 1 ADS Extension Block. The data for an attribute (D) can include the attribute string followed by the file offset to the first data item with that attribute within the corresponding bucket. The attribute-offset value pairs can be sorted in alphabetical order so that the scan for an attribute will end as soon as an attribute that is greater is encountered—indicating that no data with that attribute exists.

The query executor 170 is arranged to be capable of executing arbitrary queries. However, the way the queries work in the query executor 170 is quite unique. For instance, the query executor 170 does not need to include a query engine. Instead the query executor 170 provides the mechanisms that facilitate query execution.

The query executor 170 can execute a query by finding data items targeted by the query and then applying filter criteria to those data items. The result set can include a collection of data items that did not get filtered. The filtering criteria can be embedded in the DAC supplied by the application. As each data item is read by the ADS (using the data type provided methods), the item can be either included or excluded from the result set by verifying against the criteria included in the DAC. The ADS can delegate each read operation to the data type, and the verification can be delegated to the application logic. The DAC can contain a way to embed the application logic. For example, C++ applications may choose to include callbacks, function objects, or lambdas, in the DAC—when running data queries.

For a given ADS, the only data that needs to be held in memory can be the header portion containing the offsets to the buckets. In the case of Type 1 ADS, the bucket lookup data offsets can be held also in memory. For an ADS with, for example, about 50,000 buckets, about 0.5 MB of memory might be required for the basic ADS. To lookup an item, an index of the bucket can be initially obtained using a hash operation, snapped to the offset of the bucket, and scanned for the item data. In the case of the Type 1 ADS, for example, about 1.0 MB of bucket-data and bucket-lookup-data offsets can be held in memory. To find the data corresponding to an attribute, the index of the bucket can be obtained as known by those skilled in the art, and that index can be applied to the Extension Block. The result can provide the offset to the bucket lookup data for the computed index. The process can then snap to that offset and then scan for the attribute. If the attribute is found, the offset to the attribute's data can be obtained and the process can snap to that location in the file, and read the data of the desired attribute. If, however, the attribute is not found, then a determination can be made that no data exists for that attribute. Hence, it may be seen that a single offset can be used when using a basic ADS, but a pair or two successive offsets can be used when using a Type 1 ADS.

The ADS design can be particularly well suited to solid state disks (SSDs) because there is minimal cost incurred in moving to different file offsets. This has the added benefit of allowing multiple threads of execution to each to do a read at a different part of the ADS file without a need to mechanically move the read heads to different physical regions of the storage disk—as would happen with traditional hard disks.

The ADS grouping unit 175 can greatly enhance and compound the benefits of the ADS architecture by stacking multiple ADSs atop of each other. On a transactional platform, data can be produced at a certain rate that may be fixed or as is more typical, varying. If data is collected for different time intervals and represented using the ADS slices, then, data for larger time periods can be found by the ADS grouping unit 175 through slice composition, for example, by accumulating the data from several different ADS slices Queries that are based on time ranges can implicitly indicate which ADS slices are relevant to each data query. The ADS slices may have to be named to reflect the time periods they represent, using a format such as yyyy-mm-dd-hh-mm-ss-yyyy-mm-dd-hh-mm-ss.ext. For example, a file with a name 2020-02-16-00-00-00-2020-02-17-00-00-00.dat is an ADS slice containing data for the time range Feb. 16, 2020, 00:00:00 to Feb. 17, 2020, 00:00:00. To avoid overlaps of ADS slices, the beginning time may be considered to be inclusive, and the ending time to be exclusive. ADS requires the use of UTC for time.

Figure 7:
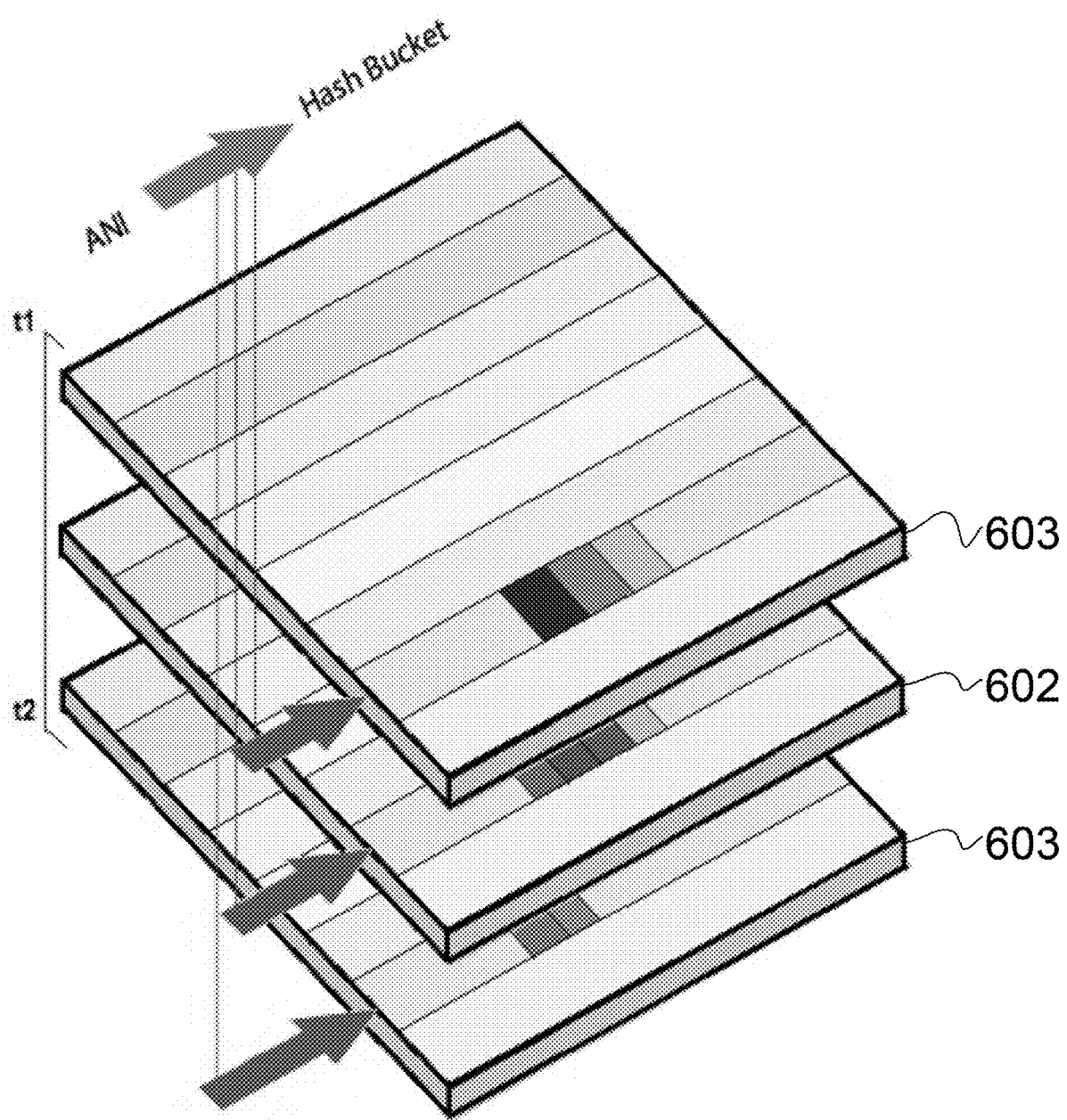
FIG. 7 depicts an example of an attributed data slice group, according to some embodiments.

FIG. 7 depicts a non-limiting example of an accumulation by the ADS grouping unit 175 of Automatic Number Identification (ANI) data across multiple ADSs. As seen in FIG. 7, an ADS group can be created and used to store the data about calls received on a telephony platform as a function of time t (for example, from time t1 to time t2). The attribute for the data in this non-limiting example is the ANI, which can be considered to be the rough equivalent of the caller's phone number, and the data item is the Call Detail Record (CDR).

Referring to FIG. 7, if each ADS represents a month's worth of data, and a user is trying to find the calls from a particular caller within a three month period, the query executor 170 can be arranged to extract the three monthly ADS slices 601-603. Then, the query executor 170 can compute the index of the data bucket by hashing the ANI. The query executor 170 can then go to each ADS, and query for the data for that ANI. Data items collected from the individual ADS slices 601-603 can be pooled together to build the final result set for the query.

As seen in FIG. 7, an ADS group 600 is inherently structured to support parallelization. In some embodiments, the ADS slices 601-603 contained by ADS group 600 can be operated on one by one. In some embodiments, the query executor 170 can also use one thread for each data slice, or use a limited pool of threads to process the selected ADS slices 601-603. The DM system 100 can include algorithms such as, for example, Map-Reduce or other multi-threaded approaches for the ADS groups 600.

While the ADS grouping unit 175 can provide the ability to parallelize operations along the stacking direction in the ADS group, the ADS slices 601-603 inside the ADS group 600 can provide a similar ability—but along an orthogonal direction which is the direction of the data buckets. The data in any data bucket can be processed completely independent of the data in any other bucket.

Figure 8:
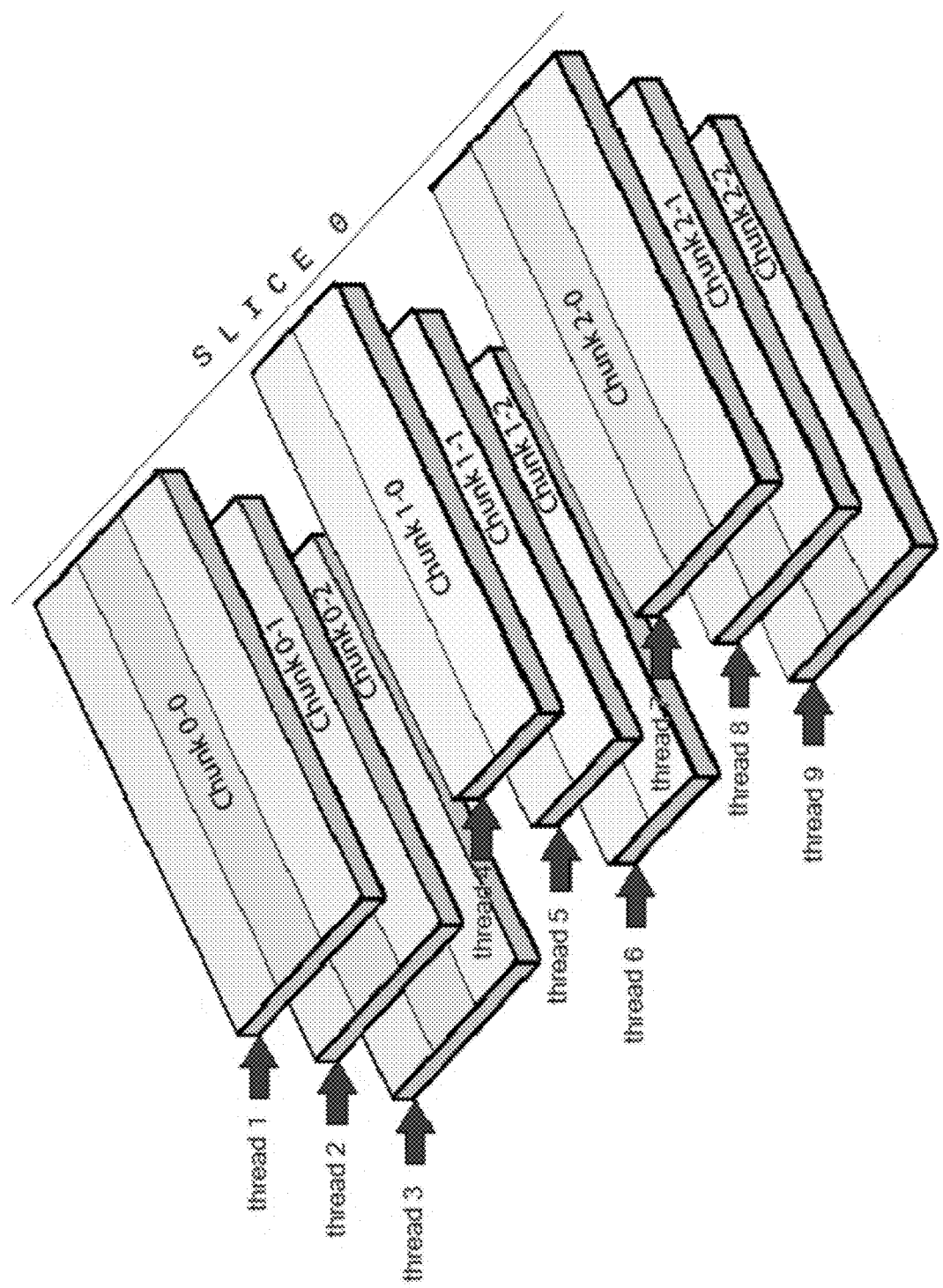
FIG. 8 depicts an example of parallelization in the attributed data slice group, according to some embodiments.

FIG. 8 shows an example of parallelization in an ADS group 700. As seen in FIG. 8, the ADS can be subdivided into any number of ranges of buckets, including as many ranges of buckets as necessary or desired. Similarly, as described above the ADS group 700, can be subdivided into as any number ADS slices, including as many ADS slices as there are physically within the group. Depending on the available number of processing cores in the processor 110 (shown in FIG. 2), the contents of the ADS group 700 can be processed in a highly parallel manner—limited only by the amount of processor capacity allowed for the computing resource processes. It may be noted that the maximum number of parallel actions possible on the ADS Group is the product of the number of ADS slices and the number of buckets in any one ADS slice.

When the ADS group is persisted to disk, it can coalesce to become a single ADS slice. In one non-limiting example, an ADS group containing the ADS slices 2020-02-16-00-00-00-2020-02-17-00-00-00.dat and 2020-02-17-00-00-00-2020-02-18-00-00-00.dat, can be written to disk. In this example, it can be stored as an ADS slice with the name 2020-02-16-00-00-00-2020-02-18-00-00-00.dat, and containing all of the data from the two ADS slices that were in the ADS group.

The ADS slice can support decomposition, wherein any given ADS slice can be broken up into further granular ADS slices that, when stacked together, would effectively work identically to the source ADS slice.

The query decomposer 180 can be arranged to interact with the query executor 170, or the query decomposer 180 can be integrated with or included in the query executor 170. The query decomposer 180 can be arranged to decompose a query into multiple subqueries, such as, for example, when the query involves multiple attributes and multiple time or data ranges. Each subquery can deal with a logical data partition within the ADS group. When parallelized this way, and the results are accumulated, the DM system 100 has the ability to execute critical queries extremely fast, and in a highly parallel manner. By using SSDs to store the ADS slices, the DM system 100 can support not only the decomposition and parallelization of individual queries, but also achieve a high degree of concurrency wherein a large number of queries are running without impacting each other's performance, providing massively scalable data processing ability.

Figure 9:
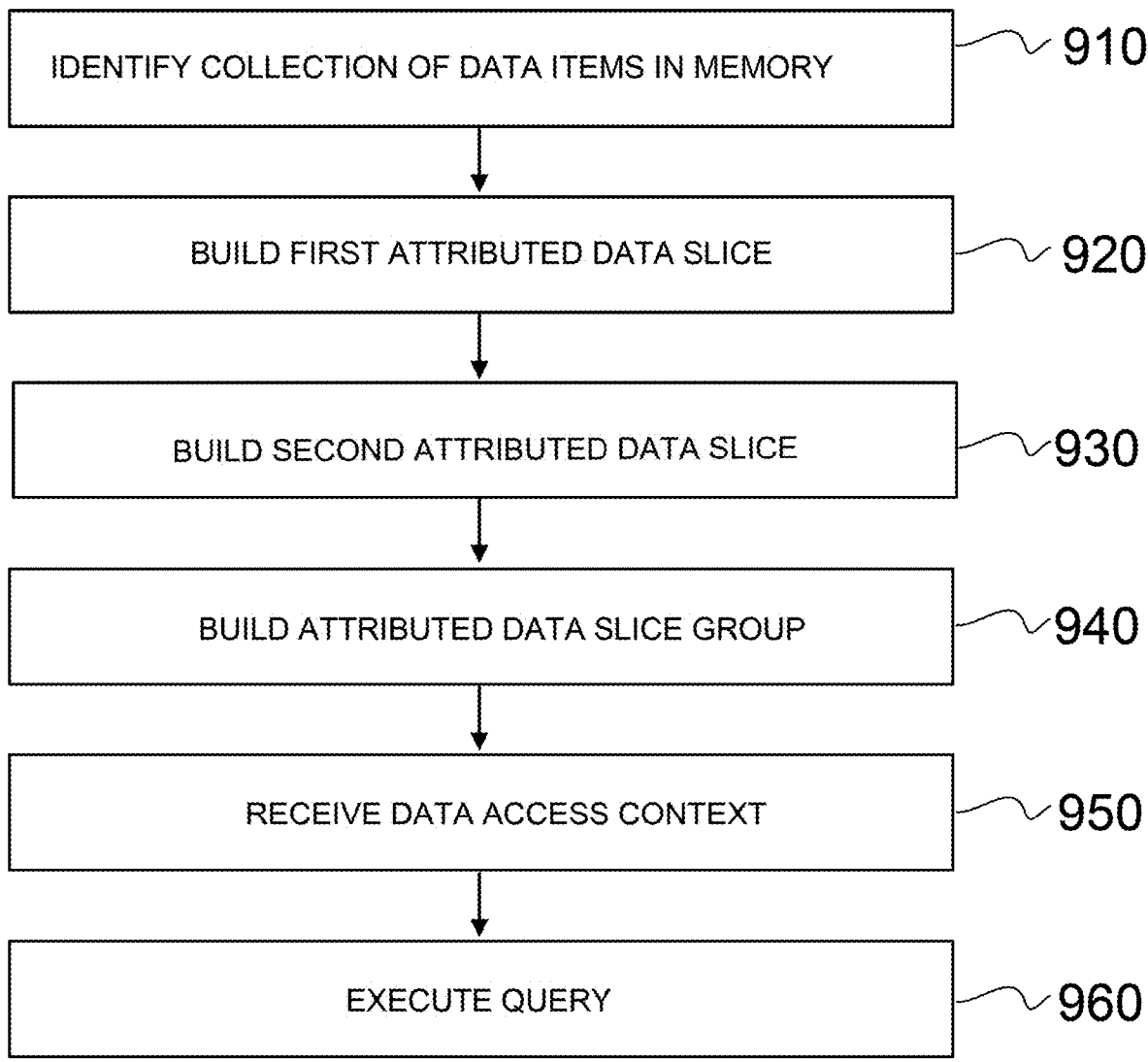
FIG. 9 depicts an example of a data management process flow using an attributed data slice group, according to some embodiments.

FIG. 9 depicts a non-limiting example of a data management process flow using an ADS group, according to some embodiments. Examples can be performed by a computing device including a processor coupled to a memory storing instructions for performing one or more operations, described below. The examples can incorporate any of the embodiments disclosed herein to include methods and systems for using an attributed data slice group for representing, organizing, or accessing data sets. In one non-limiting example, the computing device can be an embodiment of the DM server 10.

Referring to FIG. 9, at operation 910, a collection of data items is identified in memory, which can be an embodiment of data items in storage system 20 and can be related by a function of time, according to a non-limiting example. In some embodiments, the DM server 10 can represent, organize or access very large data sets in the storage system 20.

At operation 920, the DM server 10 processes a collection of data items in the storage system 20 to build an ADS. The ADS can be created in the DM server 10, storage system 20, or any other structure capable of storing a data structure. The ADS can include one or more of the following sections: a header block containing metadata for the attributed data slice, including at least one of a geometry of the attributed data slice and type of the attributed data slice; a data block containing all data buckets for the attributed data slice in a strict order, wherein each data bucket starts at a location indicated for it in the offsets table; an extension block arranged to support additional bucket level lookup data. In some embodiments, the extension block is arranged to facilitate location of data in a data bucket in the attributed data slice without any scanning. The extension block is located at an offset indicated in a header block.

Optionally, at 920, the DM server 10 can include an ADE data type to support the ADS. The ADS can also include an offsets table containing a file offset to a data bucket in the attributed data slice.

At operation 930, a second attributed data slice can be built from another collection of data items, similar to the process as described at 920. At 920, the collection of data items and the second collection of data items can be related as a function of time.

At operation 940, the first ADS can be stacked atop of the second ADS to build an attributed data slice group. The ADS group can support decomposition, wherein any given ADS can be broken up into further granular ADSs that, when stacked together, would effectively work identically to the source ADS.

At operation 950, a data access operation can be performed. The data access operation can include receiving a DAC from an application, wherein the DAC can contain filtering criteria. By applying filtering criteria, the DAC permits fine grained control on how each data query can be optimized. As a non-limiting example of how the DAC can work, consider a simple example involving ADSs containing Call Detail Records (CDRs). A CDR contains call leg objects, and app-nav objects. In one non-limiting example, a CDR may contain two or more call legs and several dozen app-navs. A query of CDR data for a given caller needs to retrieve all the CDRs for a given calling phone number (ANI)—subject to other criteria that depend on the data inside the call legs and/or the app-navs.

At operation 960, the query can be executed to identify data items contained in the ADS and to apply the filter criteria to the data items. In one example, as each data item is read by the ADS (using the data type provided methods), the item can be either included or excluded from the result set by verifying against the criteria included in the DAC. At 960, each data item can be verified against the filter criteria, and either included or excluded from a result set. The ADS can delegate each read operation to the data type, and the verification can be delegated to the application logic.

The terms "a," "an," and "the," as used in this disclosure, means "one or more," unless expressly specified otherwise.

The term "backbone," as used in this disclosure, means a transmission medium or infrastructure that interconnects one or more computing devices or communication devices to provide a path that conveys data packets and instruction signals between the one or more computing devices or communication devices. The backbone can include a network. The backbone can include an ethernet TCP/IP. The backbone can include a distributed backbone, a collapsed backbone, a parallel backbone or a serial backbone.

The term "bus," as used in this disclosure, means any of several types of bus structures that can further interconnect to a memory bus (with or without a memory controller), a peripheral bus, or a local bus using any of a variety of commercially available bus architectures. The term "bus" can include a backbone.

The term "communicating device," as used in this disclosure, means any computing device, hardware, or computing resource that can transmit or receive data packets, instruction signals or data signals over a communication link. The communicating device can be portable or stationary.

The term "communication link," as used in this disclosure, means a wired or wireless medium that conveys data or information between at least two points. The wired or wireless medium can include, for example, a metallic conductor link, a radio frequency (RF) communication link, an Infrared (IR) communication link, or an optical communication link. The RF communication link can include, for example, WiFi, WiMAX, IEEE 802.11, DECT, 0G, 1G, 2G, 3G, 4G or 5G cellular standards, or Bluetooth. A communication link can include, for example, an RS-232, RS-422, RS-485, or any other suitable interface.

The terms "computer," "computing device," or "processor," as used in this disclosure, means any machine, device, circuit, component, or module, or any system of machines, devices, circuits, components, or modules that are capable of manipulating data according to one or more instructions. The terms "computer," "computing device" or "processor" can include, for example, without limitation, a processor, a microprocessor (μC), a central processing unit (CPU), a graphic processing unit (GPU), a data processing unit (DPU), an application specific integrated circuit (ASIC), a general purpose computer, a super computer, a personal computer, a laptop computer, a palmtop computer, a notebook computer, a desktop computer, a workstation computer, a server, a server farm, a computer cloud, or an array or system of processors, μCs, CPUs, GPUs, ASICs, general purpose computers, super computers, personal computers, laptop computers, palmtop computers, notebook computers, desktop computers, workstation computers, or servers.

The terms "computer resource asset" or "computing resource asset," as used in this disclosure, means a computing resource, a computing device or a communicating device, or any combination thereof.

The term "computer-readable medium," as used in this disclosure, means any non-transitory storage medium that participates in providing data (for example, instructions) that can be read by a computer. Such a medium can take many forms, including non-volatile media and volatile media. Non-volatile media can include, for example, optical or magnetic disks and other persistent memory. Volatile media can include dynamic random-access memory (DRAM). Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read. The computer-readable medium can include a "cloud," which can include a distribution of files across multiple (e.g., thousands of) memory caches on multiple (e.g., thousands of) computers.

Various forms of computer readable media can be involved in carrying sequences of instructions to a computer. For example, sequences of instruction (i) can be delivered from a RAM to a processor, (ii) can be carried over a wireless transmission medium, or (iii) can be formatted according to numerous formats, standards or protocols, including, for example, WiFi, WiMAX, IEEE 802.11, DECT, 0G, 1G, 2G, 3G, 4G, or 5G cellular standards, or Bluetooth.

The terms "computer resource" or "computing resource," as used in this disclosure, mean software, a software application, a web application, a web page, a computer application, a computer program, computer code, machine executable instructions, firmware, or a process that can be arranged to execute on a computing device or a communicating device.

The term "computing resource process," as used in this disclosure, means a computing resource that is in execution or in a state of being executed on an operating system of a computing device, such as, for example, the processor 110 (shown in FIG. 2). Every computing resource that is created, opened or executed on or by the operating system can create a corresponding computing resource process. A computing resource process can include one or more threads, as will be understood by those skilled in the art.

The term "database," as used in this disclosure, means any combination of software or hardware, including at least one computing resource or at least one computer. The database can include a structured collection of records or data organized according to a database model, such as, for example, but not limited to at least one of a relational model, a hierarchical model, or a network model. The database can include a database management system application (DBMS). The at least one application may include, but is not limited to, a computing resource such as, for example, an application program that can accept connections to service requests from communicating devices by sending back responses to the devices. The database can be configured to run the at least one computing resource, often under heavy workloads, unattended, for extended periods of time with minimal or no human direction.

The terms "including," "comprising" and variations thereof, as used in this disclosure, mean "including, but not limited to," unless expressly specified otherwise.

The term "network," as used in this disclosure means, but is not limited to, for example, at least one of a personal area network (PAN), a local area network (LAN), a wireless local area network (WLAN), a campus area network (CAN), a metropolitan area network (MAN), a wide area network (WAN), a metropolitan area network (MAN), a wide area network (WAN), a global area network (GAN), a broadband area network (BAN), a cellular network, a storage-area network (SAN), a system-area network, a passive optical local area network (POLAN), an enterprise private network (EPN), a virtual private network (VPN), the Internet, or the like, or any combination of the foregoing, any of which can be configured to communicate data via a wireless and/or a wired communication medium. These networks can run a variety of protocols, including, but not limited to, for example, Ethernet, IP, IPX, TCP, UDP, SPX, IP, IRC, HTTP, FTP, Telnet, SMTP, DNS, ARP, ICMP.

The term "server," as used in this disclosure, means any combination of software or hardware, including at least one computing resource or at least one computer to perform services for connected communicating devices as part of a client-server architecture. The at least one server application can include, but is not limited to, a computing resource such as, for example, an application program that can accept connections to service requests from communicating devices by sending back responses to the devices. The server can be configured to run the at least one computing resource, often under heavy workloads, unattended, for extended periods of time with minimal or no human direction. The server can include a plurality of computers configured, with the at least one computing resource being divided among the computers depending upon the workload. For example, under light loading, the at least one computing resource can run on a single computer. However, under heavy loading, multiple computers can be required to run the at least one computing resource. The server, or any if its computers, can also be used as a workstation.

The term "transmission" or "transmit," as used in this disclosure, means the conveyance of data, data packets, computer instructions, or any other digital or analog information via electricity, acoustic waves, light waves or other electromagnetic emissions, such as those generated with communications in the radio frequency (RF) or infrared (IR) spectra. Transmission media for such transmissions can include coaxial cables, copper wire and fiber optics, including the wires that comprise a system bus coupled to the processor.

Devices that are in communication with each other need not be in continuous communication with each other unless expressly specified otherwise. In addition, devices that are in communication with each other may communicate directly or indirectly through one or more intermediaries.

Although process steps, method steps, or algorithms may be described in a sequential or a parallel order, such processes, methods and algorithms may be configured to work in alternate orders. In other words, any sequence or order of steps that may be described in a sequential order does not necessarily indicate a requirement that the steps be performed in that order; some steps may be performed simultaneously. Similarly, if a sequence or order of steps is described in a parallel (or simultaneous) order, such steps can be performed in a sequential order. The steps of the processes, methods or algorithms described in this specification may be performed in any order practical.

When a single device or article is described, it will be readily apparent that more than one device or article may be used in place of a single device or article. Similarly, where more than one device or article is described, it will be readily apparent that a single device or article may be used in place of the more than one device or article. The functionality or the features of a device may be alternatively embodied by one or more other devices which are not explicitly described as having such functionality or features.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A computer-implemented method for managing data based on attributed data slices, including representing, organizing, or accessing data sets, the method comprising:
    identifying a collection of data items in a memory;
    building an attributed data slice comprising a collection of data items, wherein the attributed data slice comprises a plurality of sections, including a header, an offsets table and a data block containing a plurality of data buckets;
    dividing the attributed data slice into smaller attributed data slices, wherein the dividing comprises partitioning the smaller attributed data slices along a direction of a hash bucket array, wherein each hash bucket array is aligned with specific attributes of the data items;
    receiving a query; and
    processing the query in parallel across a plurality of the smaller attributed data slices.

2. The computer-implemented method of claim 1, further comprising: building another attributed data slice from another collection of data items.

3. The computer-implemented method of claim 2, wherein said collection of data items and said another collection of data items are related as a function of time.

4. The computer-implemented method of claim 1, further comprising stacking the attributed data slice atop another attributed data slice to build an attributed data slice group.

5. The computer-implemented method of claim 1, further comprising:
    receiving data access context containing filtering criteria from an application; and
    executing a query by finding data items in the attributed data slice and applying the filter criteria to the data items.

6. The computer-implemented method of claim 1, further comprising:
    receiving the query involving multiple attributes;
    decomposing the query into a plurality of subqueries; and
    executing the plurality of subqueries in parallel.

7. The computer-implemented method of claim 6, wherein each of the plurality of subqueries is executed for a corresponding logical data partition in an attributed data slice group.

8. A system for managing data based on attributed data slices, including representing, organizing, or accessing data sets, the system comprising:
    a receiver arranged to receive data items;
    a memory arranged to store the data items;
    an attributed data slice build unit arranged to collect or organize the data items in the memory and build an attributed data slice in the memory, wherein the attributed data slice comprises sections including a header, an offsets table and a data block containing a plurality of data buckets;
    a data management unit arranged to divide the attributed data slice into smaller attributed data slices along a direction of a hash bucket array, wherein each hash bucket array is aligned with specific attributes of the data items; and
    a query executor configured to receive a query and process the query in parallel across a plurality of the smaller attributed data slices.

9. The system of claim 8, wherein the attributed data slice unit is configured to build another attributed data slice from another collection of data items.

10. The system of claim 9, wherein said collection of data items and said another collection of data items are related as a function of time.

11. The system of claim 8, further comprising an attribute data slice grouping unit arranged to stack the attributed data slice atop another attributed data slice to build an attributed data slice group.

12. The system of claim 8, further comprising:
    a data access context unit arranged to receive data access context containing filtering criteria from an application,
    wherein the query executor is arranged to execute the query by finding data items in the attributed data slice and applying the filter criteria to the data items.

13. The system of claim 11, wherein the query executor is arranged to verify each data item against the filter criteria and either include or exclude each data item from a result set.

14. The system of claim 8, further comprising:
    a query decomposer arranged to divide the query into a plurality of subqueries, wherein the query executor is arranged to execute the plurality of subqueries in parallel on the attributed data slice group,
    wherein the query involves multiple attributes.

15. The system of claim 13, wherein each of the plurality of subqueries is executed for a corresponding logical data partition in the attributed data slice group.

16. A non-transitory computer readable storage medium containing data management program instructions for managing data based on attributed data slices, including representing, organizing, or accessing data sets, the program instructions, when executed by a processor, causing the processor to perform operations, the operations comprising:
    identifying a collection of data items in a memory;

building an attributed data slice comprising the collection of data items, wherein the attributed data slice comprises sections including a header, an offsets table and a data block;

dividing the attributed data slice into smaller attributed data slices, wherein the dividing comprises partitioning the smaller attributed data slices based on attributes of the data items;

receiving a query; and processing the query in parallel across a plurality of the smaller attributed data slices.

17. The non-transitory computer readable storage medium of claim 16, the instructions further comprising: building another attributed data slice from another collection of data items.

18. The non-transitory computer readable storage medium of claim 17, wherein said collection of data items and said another collection of data items are related as a function of time.

19. The non-transitory computer readable storage medium of claim 16, the instructions further comprising stacking the attributed data slice atop another attributed data slice to build an attributed data slice group.

20. The non-transitory computer readable storage medium of claim 16, the instructions further comprising:

receiving data access context containing filtering criteria from an application; and executing a query by finding data items in the attributed data slice and applying the filter criteria to the data items.

\* \* \* \* \*